United States Patent
Mayer

[15] 3,674,044
[45] July 4, 1972

[54] OPPOSING CONTROL VORTEX VALVE

[72] Inventor: Endre A. Mayer, Birmingham, Mich.

[73] Assignee: The Bendix Corporation

[22] Filed: Jan. 8, 1970

[21] Appl. No.: 1,504

[52] U.S. Cl. ............................................ 137/81.5
[51] Int. Cl. ........................................... F15c 1/16
[58] Field of Search ................................ 137/81.5

[56] References Cited

UNITED STATES PATENTS

| | | | |
|---|---|---|---|
| 3,545,468 | 12/1970 | Freeman et al. | 137/81.5 |
| 3,216,439 | 11/1965 | Manion | 137/81.5 |
| 3,238,959 | 3/1966 | Bowles | 137/81.5 |
| 3,331,379 | 7/1967 | Bowles | 137/81.5 |
| 3,410,291 | 11/1968 | Boothe et al. | 137/81.5 |
| 3,446,078 | 5/1969 | Bowles et al. | 137/81.5 |
| 3,468,340 | 9/1969 | Di Camillo | 137/81.5 X |
| 3,481,352 | 12/1969 | Starr | 137/81.5 |
| 3,495,253 | 2/1970 | Richards | 137/81.5 |

*Primary Examiner*—Samuel Scott
*Attorney*—John R. Benefiel and Plante, Hartz, Smith and Thompson

[57] ABSTRACT

A vortex valve with tangentially opposed control and supply ports with the relative port sizes varied to control the output characteristics and produce a high or tailored gain at a desired pressure value and/or to introduce a pronounced negative resistance in an operating range of the valve. The valve is also combined with a fluid operated pressure regulating circuit, in which it is used as a flow controller.

5 Claims, 12 Drawing Figures

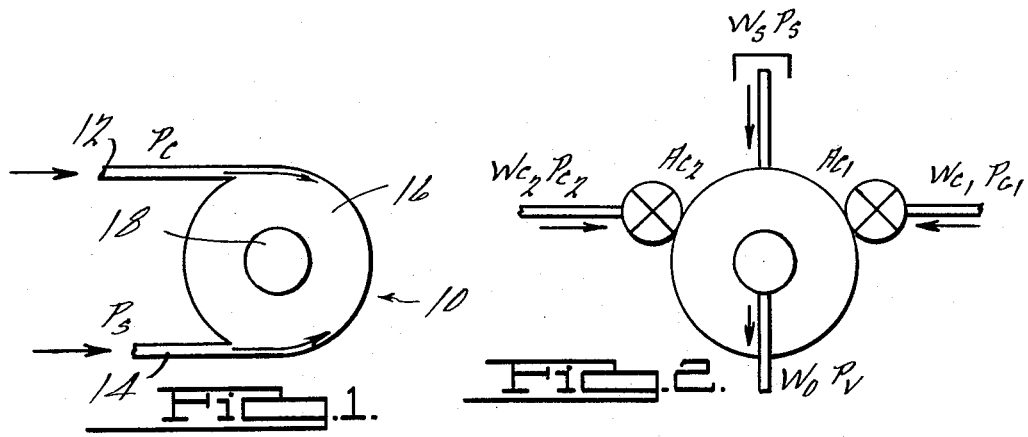
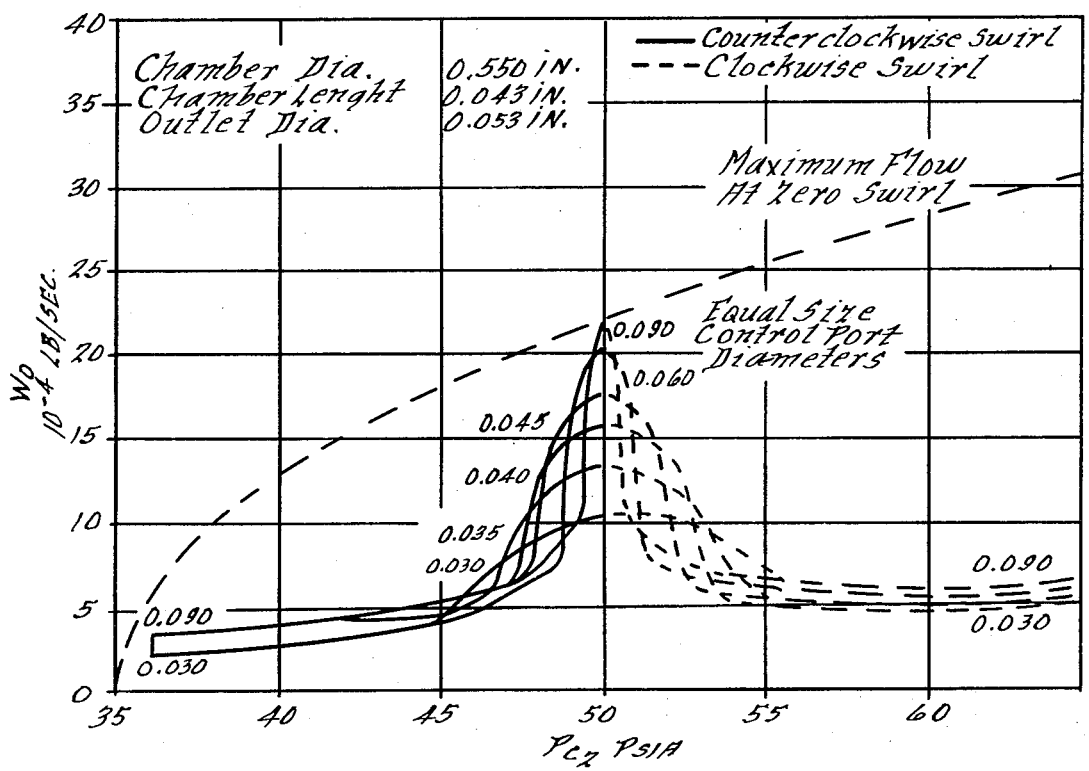

INVENTOR.
Endre A. Mayer
BY
John R. Benefiel
ATTORNEY.

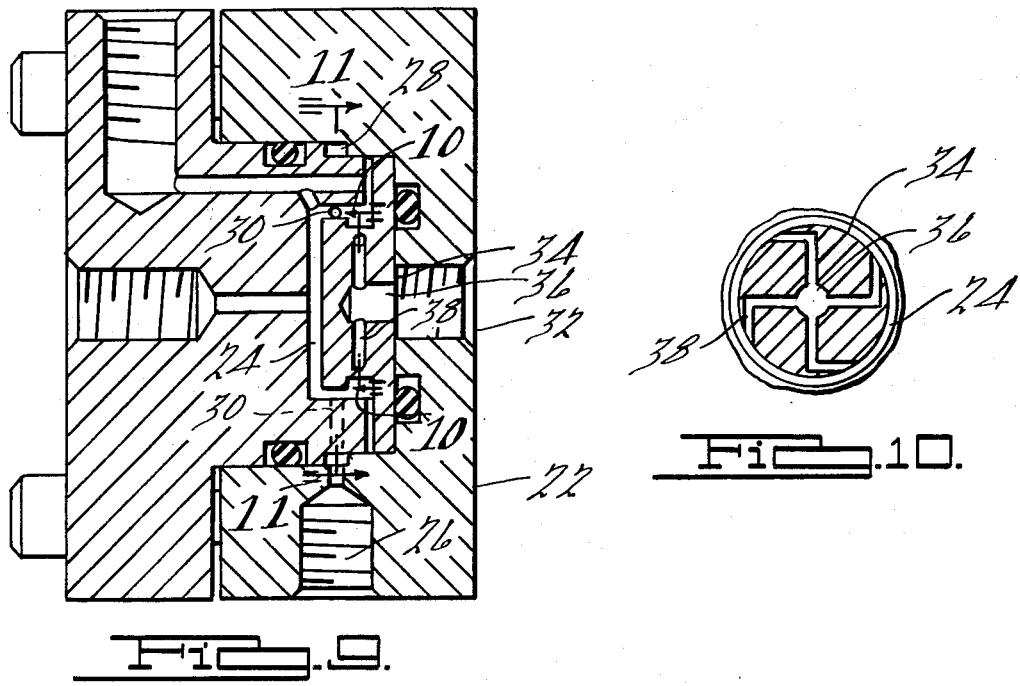
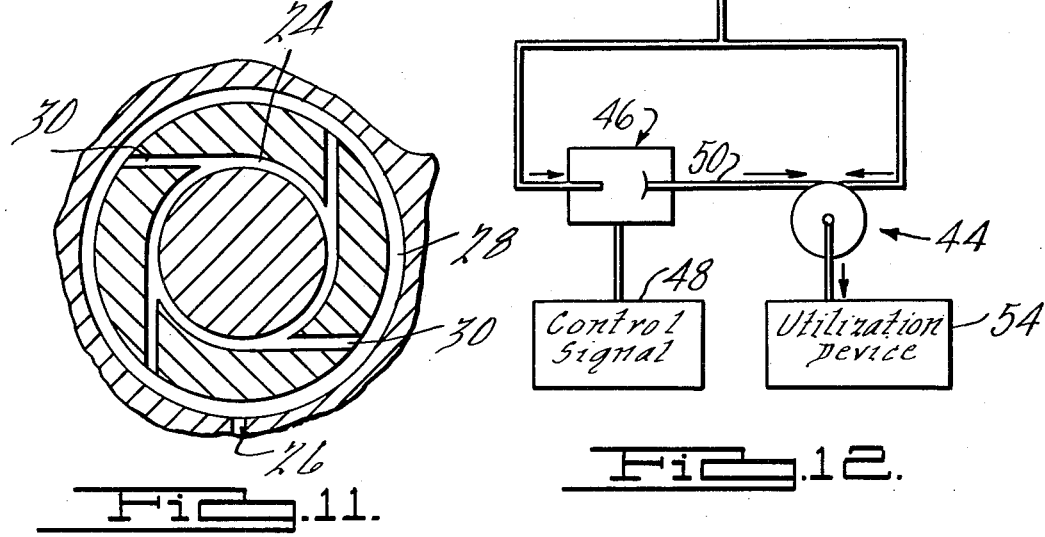

3,674,044

1

OPPOSING CONTROL VORTEX VALVE

BACKGROUND OF THE INVENTION

The vortex valve, while extremely useful in many applications possesses some drawbacks when used in certain contexts:

a. The design control over the pressure flow characteristics such as gain for particular applications of pressure, flow, etc., has not allowed for as much flexibility in the application of these valves as could be desired.

b. The obtainable negative resistance characteristics has precluded the use of vortex valves as fluidic memory or logic elements or as power oscillators which depend on a pronounced negative resistance segment subsequent to a positive resistance segment in the operating range in order to function reliably.

c. The use of vortex valves as flow controllers when a common pressure source is used as the control signal and the pressure supply has been severely limited. Vortex valves normally have at least one radial supply inlet and one or more tangential control inlets. For optimum outlet flow modulation, the radial or supply pressure must be held constant, and the control pressure must be 1.2 to 2.0 times greater than the supply pressure at the minimum flow condition. If only a single power source is available, an orifice restrictor must be used in series with the supply flow to provide the working pressure differential between supply and control pressures. The pressure differential across an orifice is at a maximum at the highest flow condition and minimum at the lowest supply flow level. Efficient operation of the valve as a flow controller requires the opposite: at maximum total flow no control flow, thus no pressure differential is required, while at minimum total flow maximum control flow, and the highest pressure differential is desired. This undesired flow pressure relation severely limits the maximum flow turndown of the conventional vortex valve operating with a common pressure source.

Therefore, it is an object of the present invention to provide a vortex valve configuration which is capable of great flexibility in designing to desired pressure flow characteristics.

It is another object to provide a vortex valve which is capable of exhibiting a pronounced negative resistance segment subsequent to a positive resistance segment in a portion of its operating range.

It is a further object to provide a vortex valve flow controller which will provide high flow gain zone when both supply and control ports are connected to a common pressure source.

SUMMARY OF THE INVENTION

These and other objects, which will become apparent upon a reading of the following specification and claims, are accomplished by providing an opposing swirl vortex valve in which the radial supply is eliminated and an opposing tangential supply port is provided, with variation of the relative size of the control and supply ports providing design control over the pressure flow characteristics of the valve.

DESCRIPTION OF THE DRAWINGS

FIG. 1 is a schematic view of the opposing control vortex valve.

FIG. 2 is schematic representation of the vortex valve model used in the analysis.

FIG. 3 is a plot of calculated data on the opposing control vortex valve, showing variation of the port diameters.

2

Figure 8:
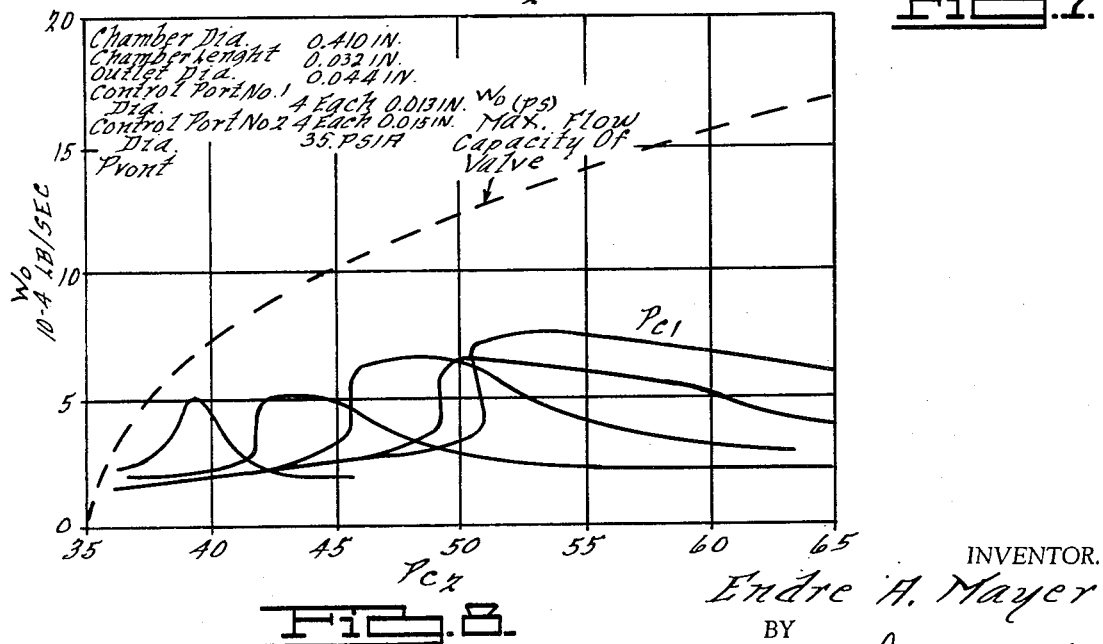

FIG. 8 is a plot of experimental data on an opposing control vortex valve, showing variations of the supply pressure.

FIG. 9 is a sectional view of an opposing control vortex valve.

FIG. 10 is a sectional view taken along the line 12—12 in FIG. 11.

FIG. 11 is a sectional view taken along the line 13—13 in FIG. 11.

FIG. 12 is a schematic representation of the opposing control vortex valve used as a flow controller.

DETAILED DESCRIPTION

In the following detailed description, certain specific terminology will be used for the sake of clarity and specific embodiments described in order to aid in providing a complete understanding of the invention, but it should be understood that the invention is not so limited and may be practiced in a variety of forms.

Referring to the drawings, FIG. 1 is a representation of the opposing control vortex valve 10 comprising a tangential No. 1 or "control" port 12, a tangential No. 2 or "supply" port 14 communicating with a vortex chamber 16 defined by a peripheral wall 17 and having a central outlet port 18 located within. As indicated, flow from the respective control and supply ports 12, 14 is directed off center from the outlet 18, and hence tends to produce opposing vortical flow in the vortex chamber 16. Of course, since both ports are directed to produce vortical flow, the terms "supply" or "control" are arbitrary or based on external connections and both could be termed "control."

In order to analyze the pressure flow characteristics, as well as to provide a complete understanding of the invention, fluid flow equations for this valve will be here included.

In order to provide a proper understanding of these equations, a schematic representation of a vortex valve is shown in FIG. 2. This representation includes a provision for radial supply flow $W_s$, but this flow will be zero in the opposing swirl vortex valve of the present invention. In addition, these equations will be based on an approach set forth in "Large-Signal Vortex Valve Analysis," ASME/HDL Fluidics Symposium, Chicago, May 1967, pp. 233–250, Advances in Fluidics. This approach involves the use of an empirical variable $W_n$ which describes the relationship between the outlet flow $W_o$ and the swirl function $\psi$, the flow vector angle from the tangential direction. This function is determined experimentally for each valve configuration as described in the above referenced article.

The following symbols listed with their definitions will be utilized:

$A$ = flow area, in$^2$
$A_2$ = outlet area, in$^2$
$A_{cl}$ = control orifice area, in$^2$
$C_1$ = flow coefficient, °R/sec
$C_{d2}$ = outlet orifice coefficient
$Cd_{cl}$ = control orifice flow coefficient
$D_1$ = vortex chamber diameter, in.
$D_2$ = outlet orifice diameter, in.
$f_1(P_v)/(P_s)$ = flow function
$g$ = gravitational constant, in/sec$^2$
$k$ = ratio of specific heats
$l$ = vortex chamber length, in.
$P_{cl}$ = control pressure, psia
$P_s$ = voreex chamber supply pressure, psia
$P_v$ = vent pressure, psia
$R$ = gas constant, in/°R
$T_c$ = control gas temperature, °R
$T_{cl}$ = gas temperature at control port 1, °R
$T_s$ = vortex chamber supply pressure, °R
$V_c$ = control flow velocity, in/sec
$V_{cl}$ = control flow velocity, in/sec
$V_{c2}$ = control flow velocity, in/sec
$V_r$ = radial flow velocity at outer wall, in/sec
$V_t$ = tangential flow velocity at outer wall, in/sec
$W_{cl}$ = control weight flow, lb/sec $W_{c2}$ = control weight flow, lb/sec
$W_o$ = outlet weight flow, lb/sec
$W_s$ = supply weight flow, lb/sec
$W_N$ = dimensionless flow variable
$\rho$ = gas density, lb/in³
$\psi$ = flow vector angle — from tangential direction, degree The flow rate out of the exhaust $W_o$ is defined by:

$$W_o = W_N C_{d2} A_2 \frac{P_s}{(T_s)^{1/2}} C_1 f_1\left(\frac{P_v}{P_s}\right) \quad (1)$$

Where, $$\left[C_1 = \frac{k_g}{R\left(\frac{k+1}{2}\right)^{\frac{k+1}{k-1}}}\right]^{1/2} \quad (2)$$

and where $$f_1\left(\frac{P_v}{P_s}\right) = \frac{\left(\frac{P_v}{P_s}\right)^{\frac{1}{k}}\left[1 - \frac{P_v}{P_s}^{\frac{k-1}{k}}\right]^{1/2}}{\left(\frac{2}{k+1}\right)^{\frac{1}{k-1}}\left(1 - \frac{2}{k+1}\right)^{1/2}} \quad (3)$$

$$f_1\left(\frac{P_v}{P_s}\right) = 1.00 \quad (4)$$

for $$\frac{P_v}{P_s} \leq \frac{2}{k+1}^{\frac{k}{k-1}} \quad (5)$$

From the conservation of mass through the device, the total flow is the sum of the individual flows $$W_o = W_s + W_{c1} + W_{c2} \quad 6.$$

where $W_s = 0$ for the present case. Using the orifice equation to calculate the first control flow $$W_{c1} = C d_{c1} A_{c1} \frac{P_{c1}}{(T_{c1})^{1/2}} C_1 f_1\left(\frac{P_s}{P_{c1}}\right) \text{ if } P_{c1} \geq P_s \quad (7)$$

where $C_1$ and $f_1 (P_s/P_{c1})$ are of the form given in Equations 2–5, and $$W_{c1} = -C d_{c1} A_{c1} \frac{P_s}{(T_{c1})^{1/2}} C_1 f_1\left(\frac{P_{c1}}{P_s}\right) \text{ if } P_s > P_{c1} \quad (8)$$

Similarly, the second control flow is calculated $$W_{c2} = C d_{c2} A_{c2} \frac{P_{c2}}{(T_{c2})^{1/2}} C_1 f_1\left(\frac{P_s}{P_{c2}}\right) \quad (9)$$

where $C_1$ and $f_1 (P_s/P_{c2})$ are of the form given in Equations 2 to 5, and $$W_{c2} = -C d_{c2} A_{c2} \frac{P_s}{(T_{c2})^{1/2}} C_1 f_1\left(\frac{P_{c2}}{P_s}\right) \text{ if } P_s > P_{c2} \quad (10)$$

The respective flow areas are calculated on the basis of circular areas $$A_2 = \frac{\pi}{4} D_2^2 \quad (11)$$

$$A_{c1} = \pi/4 \, (D^2_{c1}) \quad 12.$$

$$A_{c2} = \pi/4 \, (D^2_{c2}) \quad 13.$$

The calculation of $W_N$ first requires the evaluation of the swirl function, $\psi$, and is based on the tangential and radial velocities at the outer wall of the vortex chamber.

$$\tan (\psi) = (V_r)/(V_t) \quad 14.$$

The radial velocity is calculated on the basis of total flow, gas density, and the curtain area at the outer wall of the vortex valve.

$$V_r = \frac{W_0}{\rho A} = \frac{W_0 R T_s}{\pi D_1 l P_s} \quad (15)$$

The tangential velocities are based on momentum balance and control velocities $$V_t = 1/W_o [W_{c1} V_{c1} - W_{c2} V_{c2}] \quad 16.$$

In case of large reverse flows, the value of $V_t$, as given by equation (16), could exceed the value of $V_{c1}$ or $V_{c2}$. This cannot occur in a real vortex valve as it implies that the tangential velocity at the outer wall is greater than the maximum tangential inlet velocity. Therefore, the value of $V_t$ was limited as given by equation (17).

$$V_t \leq \text{Maximum } (V_{c1}, V_{c2}) \quad 17.$$

The control velocities are calculated on the basis of sonic velocity and Mach number.

$$V_{c1} = C M_{c1} \quad 18.$$
$$V_{c2} = C M_{c2} \quad 19.$$

where $$C = \sqrt{g k r T_c} \quad 20.$$

if $P_{c1} \geq P_s$, then $$M_{c1} \sqrt{\frac{2}{k-1}\left(1 - \left(\frac{P_s}{P_{c1}}\right)^{\frac{k-1}{k}}\right)} \quad (21)$$

for $$\frac{P_s}{P_{c1}} > \left(\frac{2}{k+1}\right)^{\frac{k}{k-1}} \quad (22)$$

and the mach number is limited to subsonic conditions by $$M_{c1} = \frac{2}{k+1} \text{ for } \frac{P_s}{P_{c1}} \leq \frac{2}{k+1}^{\frac{k}{k-1}} \quad (23)$$

In the reverse flow condition if $$P_{c1} < P_s \quad (24)$$
$$M_{c1} = 0 \quad (25)$$

$M_{c2}$ is calculated in a parallel manner, using equations (21) to (25) but replacing $P_{c1}$ with $P_{c2}$.

The value of $W_N$, required to solve equation (1), is defined by a set of discrete experimental points for a specific vortex valve geometry as described in the above referenced article.

These equations, since they are non-linear, must be solved by iterative or some other computer techniques.

The results of solutions to these equations are plotted in FIGS. 3–7. In this analysis, $P_{c1}$ will be considered the "supply" and $P_{c2}$ will be considered as the "control" pressures.

FIG. 3 shows the pressure-flow curves for various equal size port diameters and a "supply" pressure $P_{c1}$ of 50 psi. These indicate maximum flow will occur when $P_{c2} = P_{c1}$ and vortical flow is zero. For large control port sizes, their restrictive effect becomes negligible and the flow is limited almost entirely by the outlet port. These curves also indicate that the high gain pressure flow curve portion of the valve occurs at $P_{c2}$ values just under the "supply" pressure $P_{c1}$. This indicates that flow through the valve may be effectively controlled with a control pressure less than the "supply" pressure an important characteristic in flow controller contexts, as pointed out above.

Figure 4:
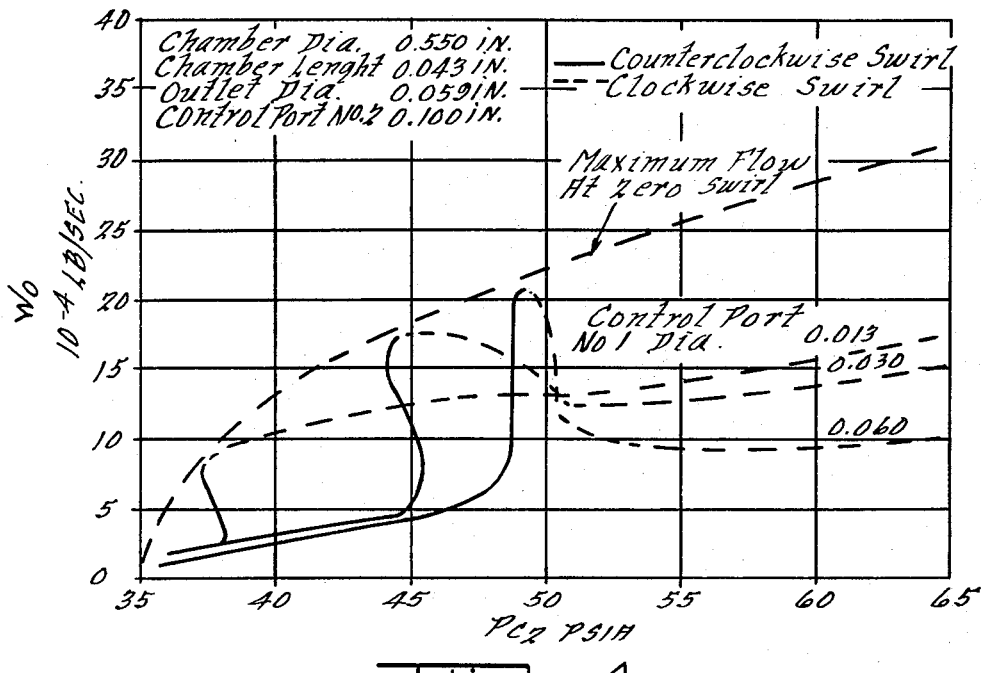
FIG. 4 is a plot of calculated data on the opposing control vortex valve, showing a variation of the No. 1 port diameter.
Figure 5:
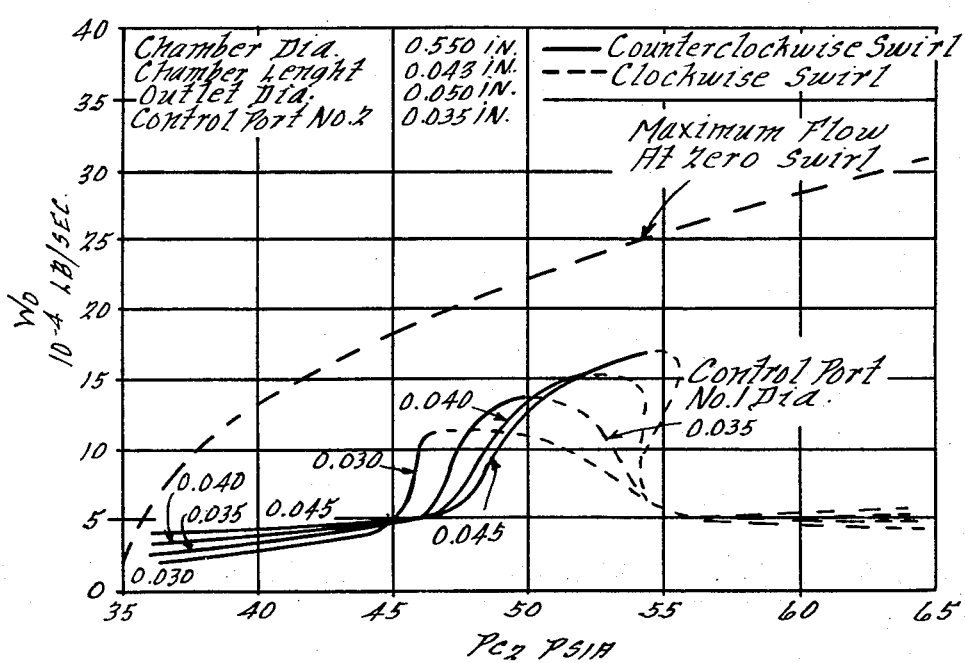
FIG. 5 is a plot of calculated data on the opposint control vortex valve, showing variations of the No. 2 port diameter.

FIGS. 4 and 5 demonstrate the surprising effect of varying the area of the No. 1 control port, $Ac_1$. In FIG. 4, for a supply pressure Pc of 50 psi, a pronounced negative resistance characteristic or subsequent increasing flow with a decrease in control pressure, occurs for control port No. 1 diameters 0.013 inches and 0.030 inches compared to the control port No. 2 diameter of 0.100 inches, while an extremely high gain segment is produced by a No. 1 control port diameter of 0.060 inches.

FIG. 5 shows more clearly other effects of the variation in relative diameters. The curve of the 0.030 inch diameter No. 1 control port for the 0.035 inch diameter No. 2 control port shows that the high gain segment of the curve has been shifted to a point substantially below the 50 psi supply pressure, hence providing some design control over this aspect of the pressure flow characteristic.

Increasing the No. 1 control port above the diameter of the No. 2 control port, as indicated in curves for the 0.0040 and 0.045 in diameter No. 1 control ports, creates a similar effect on the clockwise swirl flow conditions as decreasing the diameter has on the counterclockwise swirl flow conditions. That is, a high gain portion is introduced for the 0.040 inch diameter No. 1 control port while a range of triple flow values for a given control pressure value is introduced for the 0.045 inch diameter No. 1 control port diameter.

This effect is also created by variation of the No. 2 control port with the No. 1 control port diameter.

Figure 6:
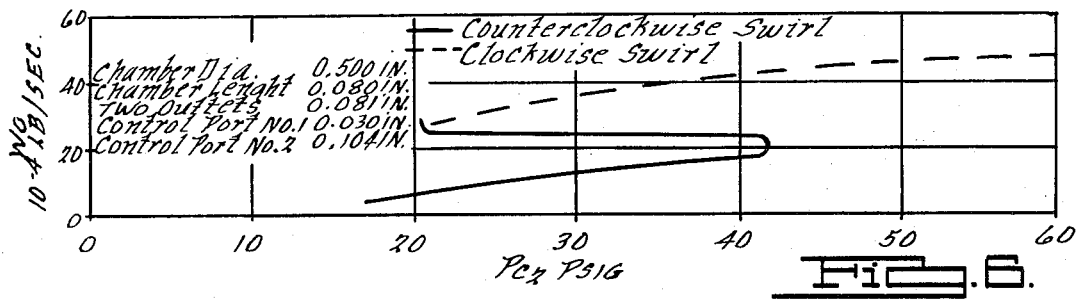
FIG. 6 is a plot of calculated data on the opposing control vortex valve, showing a pressure flow curve for a double outlet valve with a No. 2 port diameter greater than the No. 1 port diameter.

To demonstrate the extreme effect possible, a dual outlet vortex valve configuration which exhibits a slight negative resistance with a conventional radial supply was analyzed, and the results are plotted in FIG. 6. The negative resistance is extremely pronounced, which would make this particular configuration useful as a fluidic memory element, since triple flow values are obtained from a single control pressure depending on the history of flow in the valve.

Figure 7:
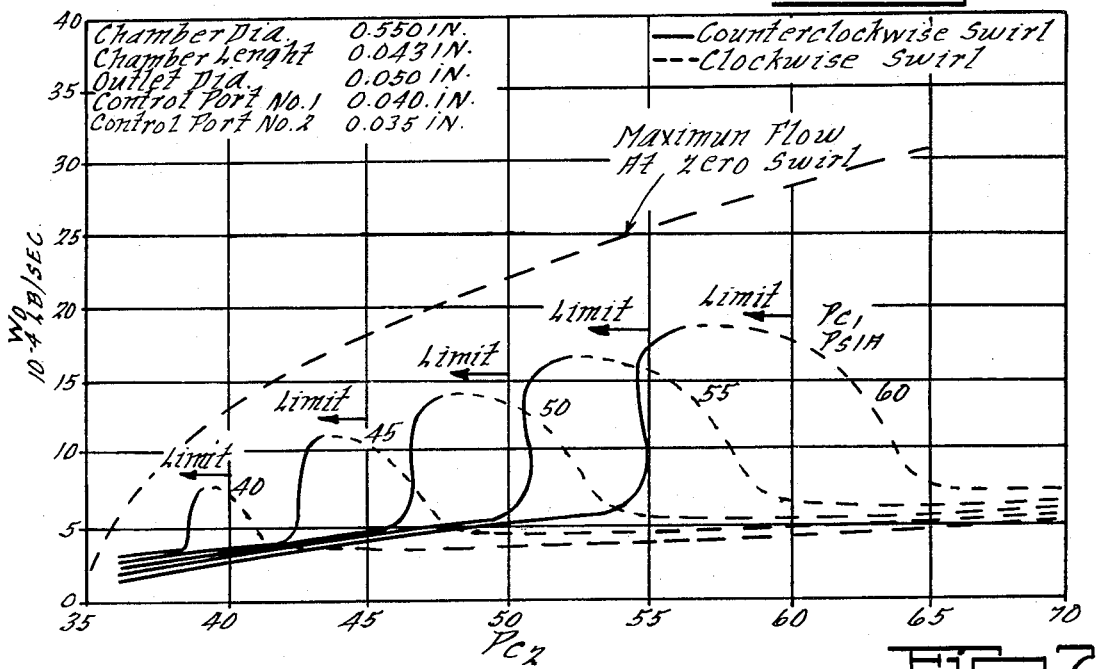
FIG. 7 is a plot of calculated data on the opposing control vortex valve, showing variations of the supply pressure.

These curves were generated considering one of the control ports being supplied with constant pressure $P_c$ at 50 psi. FIG. 7 shows a family of curves created by different constant input pressures $P_c$. This indicates that the value of the supply $P_{c1}$ pressures will also influence the shape of the pressure flow curve, with increasing gains with increasing supply pressure until a significant negative resistance characteristic is created at $P_{c1} = 50$ psi.

Experimental data has been generated to corroborate these calculations, and the results have revealed good agreement. FIG. 8 shows a plot of such data for a vortex valve of similar proportions although smaller than that producing the curves of FIG. 7, showing a similar result.

FIGS. 9-11 show a vortex valve with opposing control ports. Referring to FIG. 9, a valve body 20 mates with a complementary valve body 22 to create a vortex chamber 24.

The vortex chamber 24 is supplied with a first fluid inlet 26 which communicates with an annular passage 28 which supplies fluid to the vortex chamber 24 via four tangential inlets 30. A second fluid inlet 32 supplies fluid via a replaceable button 34, formed with a central passage 36 and four passages 38 directed tangentially and opposed to the passages 30. An outlet is provided at 40.

In this arrangement, the sum of the areas of the respective passages 38, 30 are varied relative each other by replacing the button 34 with other buttons having alternately sized passages 38.

FIG. 12 illustrates schematically the incorporation of this valve into a pressure regulating device. A pressure source 12 is connected to one port of an opposing control vortex valve 44 and is also connected to the inlet of a fluid amplifier 46, shown as a confined jet type fluid amplifier. The system also includes a control device 48 which produces a fluid output signal which could be indicative of the pressure at the outlet 52. The control device 48 output signal, is applied to the amplifier jet chamber to produced a variable fluid signal at the outlet 50, which is applied to another opposed port of the vortex valve 44. The outlet 52 is connected to the utilization device 54, which is thus provided with fluid flow that is dependent on the control device 48, and will be provided with constant pressure if this device is arranged to produce signals upon variation of the outlet pressure from a desired value.

From the foregoing description, it can be appreciated that by using the opposing control vortex valve 44 the pressure level produced at the outlet may be close to that at the source 42 since no orifice is required to drop the pressure to substantially below that at 50.

This is because the fluid flow through the valve may be effectively controlled by pressures at 50 of the same approximate magnitude as that at the port 43.

Thus it should be appreciated that a vortex valve has been provided which substantially enhances the usefulness of this device in several contexts, and which has not significantly increased the cost or the complexity thereof.

What is claimed is:
1. An opposing control vortex valve device comprising:
    a vortex chamber including a peripheral wall and an outlet located inside of said peripheral wall;
    a first inlet port means in direct communication with said vortex chamber;
    first means to direct fluid through said first port off center from said outlet into said vortex chamber to tend to produce vortical flow therethrough;
    a second inlet port means in direct communication with said vortex chamber, with the area of said second inlet port means differing from the area of said first inlet port means; and
    second means to direct fluid through said second port off center from said outlet into said vortex chamber to tend to produce vortical flow opposing that introduced by said first port means, wherein said first and second inlet port means are the only inlets into said vortex chamber.
2. The device of claim 1 wherein the area difference between said first and second inlet ports is great enough to produce a vertical pressure flow characteristic in an operating range of said device.
3. The device of claim 1 wherein the area difference between said first and second inlet port means is sufficient to introduce a negative resistance segment in an operating range of said device.
4. The device of claim 1 wherein said first and second means direct fluid tangentially to said peripheral wall in opposing directions.
5. The device of claim 1 wherein said first inlet port means includes a plurality of first inlet ports and the second inlet port means includes a plurality of second inlet ports, with the aggregative area of said second inlet ports differing substantially from the aggregative area of said first inlet ports.

* * * * *